(12) United States Patent
Jerisk et al.

(10) Patent No.: US 11,267,305 B2
(45) Date of Patent: Mar. 8, 2022

(54) DOUBLE ROLLING LOBE CRIMPLESS GUIDE TUBE

(71) Applicant: Continental Automotive Systems, Inc., Auburn Hills, MI (US)

(72) Inventors: Joseph G. Jerisk, Burton, MI (US); Garrett M. Pniewski, Bloomfield Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 129 days.

(21) Appl. No.: 16/707,317

(22) Filed: Dec. 9, 2019

(65) Prior Publication Data
US 2021/0170823 A1    Jun. 10, 2021

(51) Int. Cl.
| | | |
|---|---|---|
| *B60G 15/12* | (2006.01) | |
| *B60G 11/27* | (2006.01) | |
| *F16F 9/04* | (2006.01) | |
| *F16F 9/05* | (2006.01) | |
| *F16F 9/32* | (2006.01) | |

(52) U.S. Cl.
CPC ............ *B60G 11/27* (2013.01); *F16F 9/0454* (2013.01); *F16F 9/05* (2013.01); *F16F 9/3271* (2013.01); *B60G 2202/152* (2013.01); *B60G 2206/42* (2013.01); *F16F 2222/126* (2013.01); *F16F 2226/04* (2013.01)

(58) Field of Classification Search
CPC ......... B60G 11/27; B60G 15/12; F16F 9/0454
USPC ......... 267/64.11, 64.19, 64.21, 64.23, 64.24, 267/64.27, 122, 220; 188/321.11
See application file for complete search history.

(56) References Cited

U.S. PATENT DOCUMENTS

| | | | | |
|---|---|---|---|---|
| 4,447,066 | A | * | 5/1984 | Katagiri ................... F16J 15/52 277/636 |
| 4,529,213 | A | * | 7/1985 | Goodman ................. F16F 9/38 188/322.12 |
| 6,337,733 | B1 | | 1/2002 | Makinouchi |
| 6,402,999 | B1 | * | 6/2002 | Sadr .................... B29C 65/0672 156/294 |
| 6,474,630 | B1 | * | 11/2002 | Weitzenhof ........... F16F 9/0463 267/122 |
| 9,446,647 | B2 | * | 9/2016 | Kawahara ............ B60G 15/062 |
| 10,752,071 | B2 | * | 8/2020 | Gleu ......................... F16F 9/05 |
| 2018/0154725 | A1 | * | 6/2018 | Pniewski ................ B60G 15/12 |

FOREIGN PATENT DOCUMENTS

EP    2407686 A2    1/2012

OTHER PUBLICATIONS

International Search Report and the Written Opinion of the International Searching Authority dated Mar. 2, 2021 for the counterpart PCT Application No. PCT/2020/070878.

* cited by examiner

*Primary Examiner* — Christopher P Schwartz

(57) ABSTRACT

An air spring assembly includes a guide tube having a plurality of fixing openings spaced circumferentially from each other and a bellow including a plurality of tabs. The bellow is disposed within the guide tube and the plurality of tabs are received within a corresponding one of the fixing openings.

20 Claims, 8 Drawing Sheets

DOUBLE ROLLING LOBE CRIMPLESS GUIDE TUBE

TECHNICAL FIELD

The present disclosure relates to air spring assemblies for a vehicles that include an air bellow with rolling lobes secured to a guide tube.

BACKGROUND

An air spring assembly for a motor vehicle includes a bellow filled with air to support the vehicle and absorb road inconsistencies. The bellow is often surrounded by a guide tube to provide protection and orientation. A clamp ring is sometimes inserted into an interior of the bellow to facilitate attachment to the guide tube. The clamp ring is a metal part inserted into the bellow to enable attachment to the guide tube. Insertion of the clamp ring into the bellow complicates assembly operations.

SUMMARY

An air spring assembly according to a non-limiting exemplary embodiment includes, among other possible things, a guide tube including a first end, a second end and a plurality of fixing openings spaced circumferentially from each other and a bellow including a plurality of tabs extending from an outer surface of the bellow, wherein the bellow is disposed within the guide tube and the plurality of tabs are received within a corresponding one of the fixing openings.

In another disclosed embodiment of the foregoing air spring assembly, the tabs include a retention portion spaced apart from the outer surface of the bellow by a stem portion, wherein the retention portion is larger than the fixing openings.

In another disclosed embodiment of any of the foregoing air spring assemblies, the retention portion includes a rounded surface to aid in insertion through a corresponding one of the plurality of fixing openings.

In another disclosed embodiment of any of the foregoing air spring assemblies, the plurality of tabs are formed of the same material as the bellow.

In another disclosed embodiment of any of the foregoing air spring assemblies, the plurality of tabs are integral portions of the bellow.

In another disclosed embodiment of any of the foregoing air spring assemblies, the plurality of fixing openings are all spaced a common distance from one of the first end and the second end.

In another disclosed embodiment of any of the foregoing air spring assemblies, the plurality of fixing openings are spaced apart from a midpoint between the first end and the second end.

In another disclosed embodiment of any of the foregoing air spring assemblies, the guide tube includes at least one retention groove extending circumferentially about an interior surface and aligned with the plurality of fixing openings.

In another disclosed embodiment of any of the foregoing air spring assemblies, the plurality of fixing openings comprises two fixing openings spaced 180 degrees apart and the plurality of tabs comprise two tabs spaced 180 degrees apart.

In another disclosed embodiment of any of the foregoing air spring assemblies, the plurality of fixing openings comprises three fixing openings spaced 120 degrees apart and the plurality of tabs comprise three tabs spaced 120 degrees apart.

In another disclosed embodiment of any of the foregoing air spring assemblies, the plurality of fixing openings comprises four fixing openings spaced 90 degrees apart and the plurality of tabs comprises four tabs spaced 90 degrees apart.

A method of assembling an air spring assembly according to another non-limiting exemplary embodiment of this disclosure includes, among other possible things, forming a bellow to include a plurality of tabs that extend from an outer surface, forming a guide tube to include a plurality of fixing openings disposed within a common plane spaced circumferentially apart from each other, placing the bellow within the guide tube and assembling the plurality of tabs through corresponding ones of the plurality of fixing openings to retain the bellow in a desired orientation relative to the guide tube.

In another disclosed embodiment of the foregoing method, the bellow and the plurality of tabs are formed as a single integral part.

In another disclosed embodiment of any of the foregoing methods, forming the tabs includes forming a retention portion spaced apart from the outer surface of the bellow by a stem portion, wherein the retention portion is larger than the fixing openings.

In another disclosed embodiment of any of the foregoing methods, the retention portion is formed to include a rounded surface to aid in insertion through a corresponding one of the plurality of fixing openings.

In another disclosed embodiment of any of the foregoing methods, the plurality of fixing openings are formed to be spaced apart a common distance from a first end of the guide tube.

In another disclosed embodiment of any of the foregoing methods, the plurality of fixing openings are formed to be spaced apart from a middle point between the first end and a second end of the guide tube.

In another disclosed embodiment of any of the foregoing methods, the guide tube is formed to include at least one retention groove extending circumferentially about an interior surface and aligned with the plurality of fixing openings.

In another disclosed embodiment of any of the foregoing methods, forming the plurality of fixing openings comprises forming three fixing openings spaced 120 degrees apart and forming the plurality of tabs comprises forming three tabs spaced 120 degrees apart.

In another disclosed embodiment of any of the foregoing methods, forming the plurality of fixing openings comprises forming four fixing openings spaced 90 degrees apart and forming the plurality of tabs comprises forming four tabs spaced 90 degrees apart.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
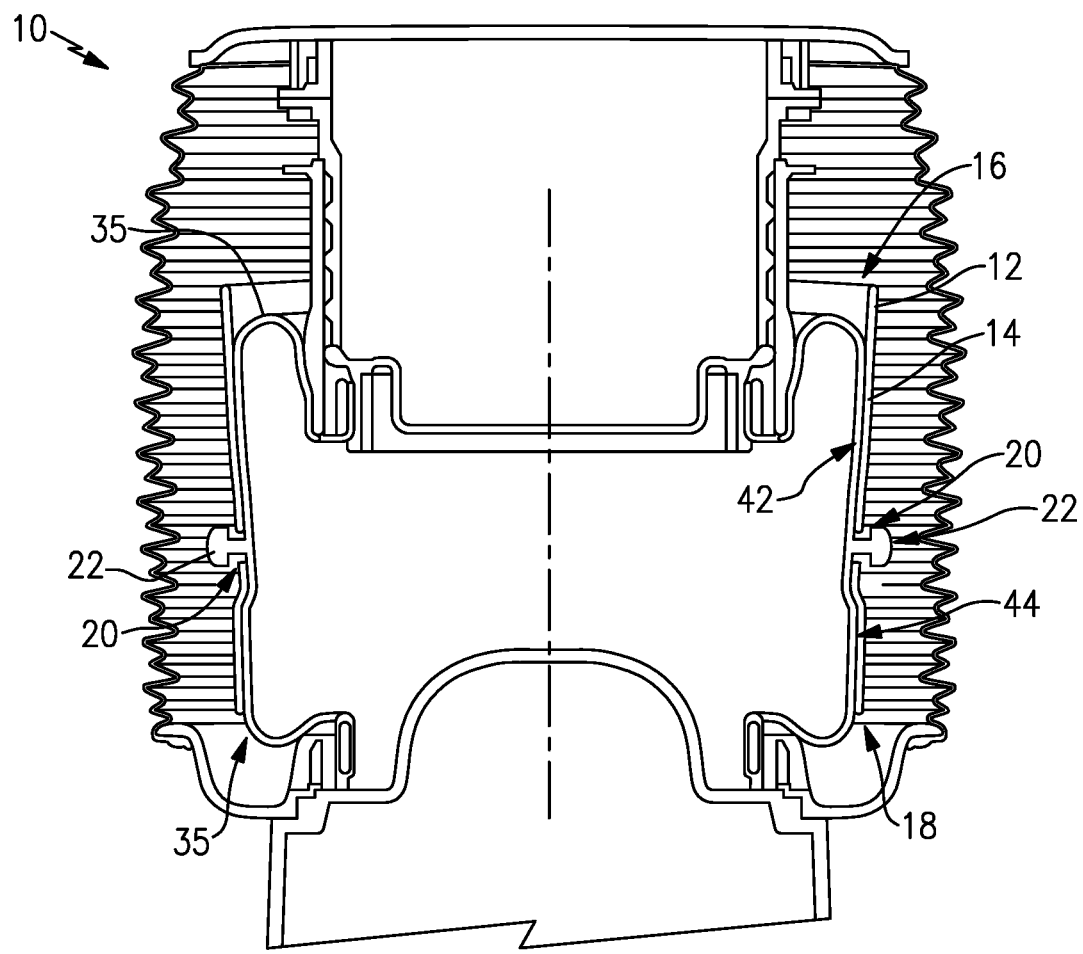
FIG. 1 is a schematic view of a portion of an air spring assembly for a vehicle.

Referring to FIG. 1, an example air spring assembly 10 is schematically shown and includes a bellow 14 attached to a guide tube 12. The bellow 14 is attached to the guide tube 12 at several points at an interface between a tab 22 and a fixing opening 20. The tab 22 is an integral portion of the bellow 14 and eliminate the need for additional structures and process to attach the bellow to the guide tube 12. The disclosed air spring 10 orientated the bellow 14 in a double rolling lobe configuration, with the two lobes indicated at 35. In a double rolling lobe configuration little to nor force is applied to the interface between the guide tube 12 and the bellow 14. In operation, both lobes 35 apply equal force to hold the guide tube 12 in place once the bellow 14 is inflated.

A plurality of fixing openings 20 that are equally spaced about a circumference of the guide tube 12. A corresponding plurality of tabs 22 are equally spaced about a circumference of the bellow 14. The tabs 22 are structures that are integral to the bellow 14. The tabs 22 extend from an outer surface 44 of the bellow 14 and fit through a corresponding fitting opening 20 to hold a portion of the bellow 14 against an interior surface 42 of the guide tube 12. Prior to inflation, the tabs 22 hold the bellow 14 in a desired orientation within the guide tube 12. Once the bellow 14 is filled with air, air pressure within the bellow 14 holds the bellow 14 in place. Moreover, the interface between the tabs 22 of the bellow 14 and the guide tube 12 provide a double rolling bellow configuration desired for the example air spring assembly 10.

Figure 2:
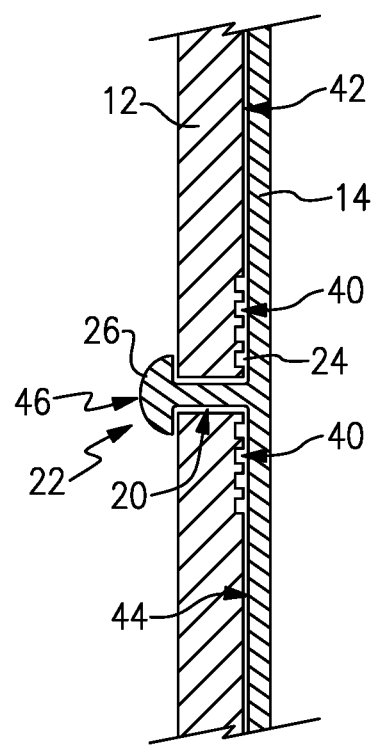
FIG. 2 is a schematic view of an example interface between a guide tube and bellow of an example air spring assembly.
Figure 3:
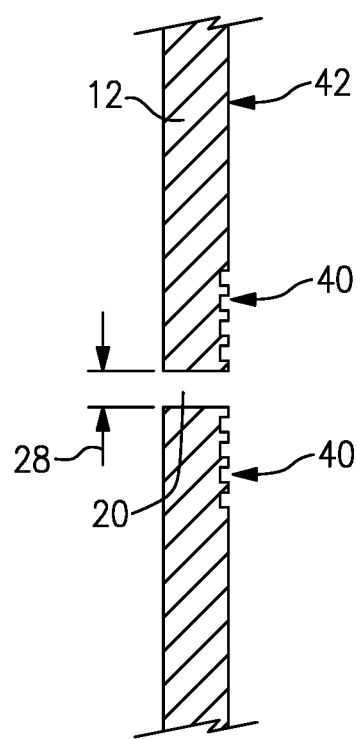
FIG. 3 is a schematic view of a portion of an example guide tube embodiment.
Figure 4:
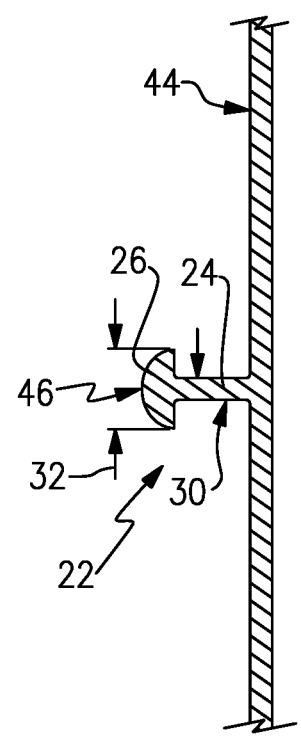
FIG. 4 is a schematic view of a portion of an example bellow embodiment.

Referring to FIGS. 2, 3 and 4, one of the tabs 22 and one of the fixing openings 20 is show in an enlarged view. The tab 22 includes a retention portion 26 and a stem portion 24. The stem portion 24 includes a width 30 that fits within the fixing opening 20. The retention portion 26 includes a width 32 that is larger than a width 28 of the fixing opening 20 and includes a semi-spherical surface 46. It should be understood, that the width 32 and 28 may reflect a diameter for a tab 22 and fixing opening 20 that are both round. Moreover, it is within the contemplation of this disclosure that the tab 22 and the fixing openings 20 may be differently shaped, including polygonal shapes. Additionally, the width 24 may be a slight interference fit with the opening 20 to provide aid in holding the tab 22 in place.

The tab 22 is formed of the same material as the bellow 14. The bellow 14 is formed form a rubber material that is sufficiently compliant to deform in response to an applied air pressure and vehicle loads. The tabs 22 maybe formed and/or attached during a vulcanization process used to treat the bellow 14. The tab 22 is further compliant sufficiently to enable the retention portion 26 to be pulled through the smaller fixing opening 20. Once through the fixing opening 20, the retention portion 26 expands and holds the bellow 14 against the inner surface 42 of the guide tube 12.

The interior surface 42 of the guide tube 12 includes grooves 40 at the fixing openings 20 to inhibit movement of the bellow 14. Once air pressure is applied to the bellow 14, the bellow 14 will press against the interior surface 42 and the grooves 40. The pressure against the grooves 40 aids in holding the bellow 14 in place relative to the guide tube 12. The grooves 40 generate resistance to movement of the bellow 14 relative to the guide tube 12.

Figure 5:
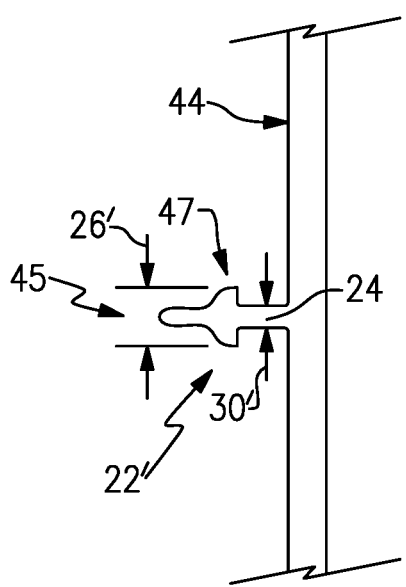
FIG. 5 is a schematic view of a portion of another example bellow embodiment.

Referring to FIG. 5, another example tab embodiment is shown and indicated at 22'. The tab 22' includes an elongated portion 45 that extends from a flange portion 47. The elongated portion 45 may extend through the opening 20 in the guide tube 12 and may ease assembly. The flange portion 47 is of sufficient width 26' to prevent the tab 22' from being pulled back through the opening 20. A width 30' of the stem 24 corresponds with the size of the opening 20.

Figure 6:
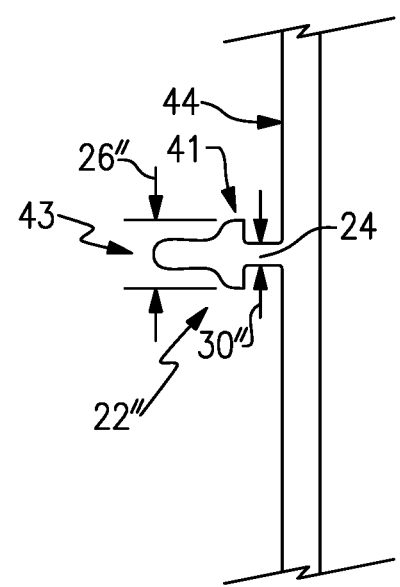
FIG. 6 is a schematic view of a portion of yet another example bellow embodiment.

Referring to FIG. 6, yet another example tab embodiment is shown and indicated at 22". The tab 22" includes an extended rounded portion 43 that extends from a flange portion 41. The extended rounded portion 43 may ease assembly while the flange portion 41 includes a width 26" that resists being pulled back through the opening 20. A width 30" of the stem portion 24 corresponds with the size of the opening 20.

In the disclosed example tabs 22, 22' and 22" each of the retention portions includes a rounded surface that aids in pulling of the tab through an opening and a flange portion that prevents the tab from being pulled back through the opening. It should be appreciated that although several tab shapes and configurations are disclosed by way of example other shapes of the tab could be utilized. Accordingly, any tab shape that enables pull through of the tab for assembly and prevents tabs from being pulled back through the opening could be utilized within the scope and contemplation of this disclosure.

Figure 7:
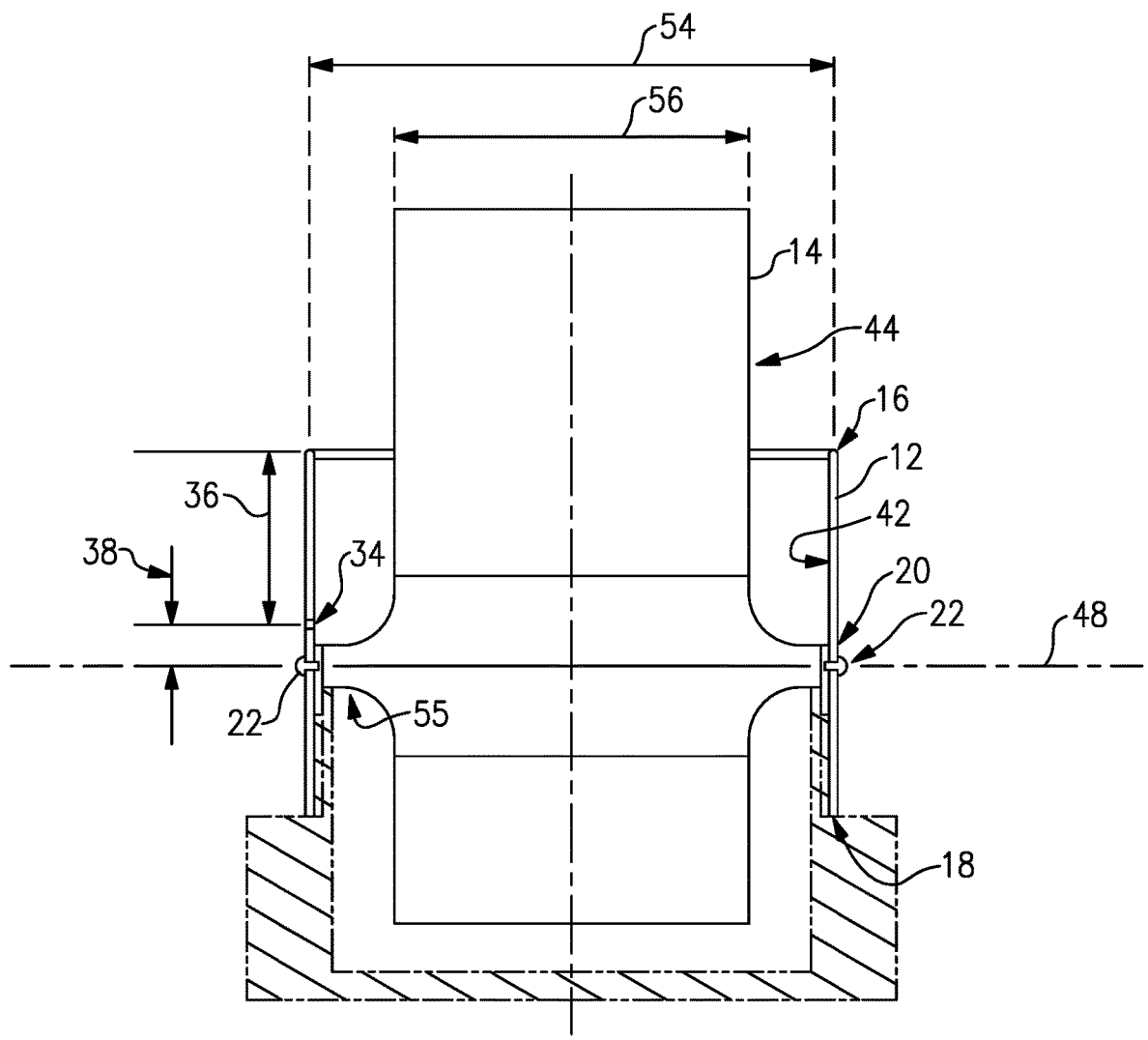
FIG. 7 is a schematic view of an example guide tube and bellow assembly.

Referring to FIG. 7 with continued reference to FIG. 1, the example bellow 14 is shown assembled to the guide tube 12 in a non-inflated condition. The guide tube 12 includes a first end 16 and a second end 18 that are open. The bellow 14 includes an outer diameter 56 in a non-inflated state that is smaller than an interior diameter 54 of the guide tube 12. During assembly, the tabs 22 formed on the outer surface 44 of the bellow 14 are pulled outwardly and inserted into a corresponding one of the fixing openings 20. The tabs 22 hold a localized portion 55 of the bellow 14 in contact with the interior surface 42 of the guide tube 12.

The fixing openings 20 are disposed within a common plane indicated at 48. A middle point 34 is space an equal distance 36 from each of the ends 16, 18. The common plane 48 is spaced apart from the midpoint 34 a distance 38. The spacing from the midpoint 34 results in the plane 48 offset between the first end 16 and the second end 18. In this disclosed example, the plane 48 and thereby the fixing openings 20 are disposed closer to the second end 18 than the first end 16. The uneven spacing is provided to position a lobe 35 of the bellow 14 in a desired position.

Figure 8A:
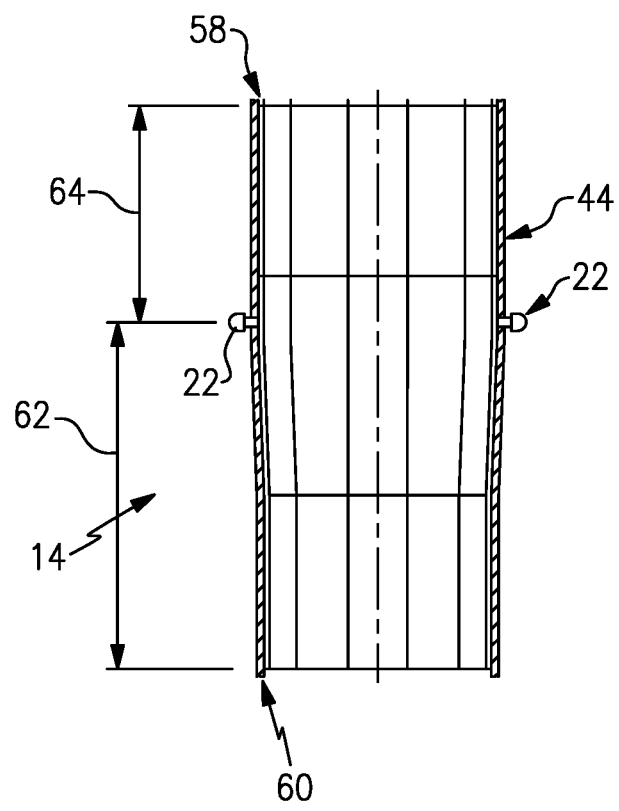
FIG. 8A is a side sectional view of an example bellow embodiment.
Figure 8B:
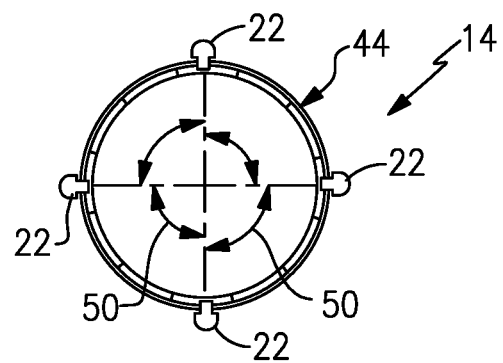
FIG. 8B is a top sectional view the example bellow.

Referring to FIGS. 8A and 8B, the example bellow 14 is shown in an uninflated state. The tabs 22 are spaced a distance 64 from a first end 58 and a distance 62 from a second end 60. The distance 64 and distance 62 are different to orientate the tabs 22 in a desired position relative to the guide tube 12.

The tabs 22 are spaced equally apart about a circumference of the exterior surface 44. In one disclosed example, there are four tabs 22 that are equally spaced apart 90 degrees from each other as indicated by arrows 50.

Figure 9B:
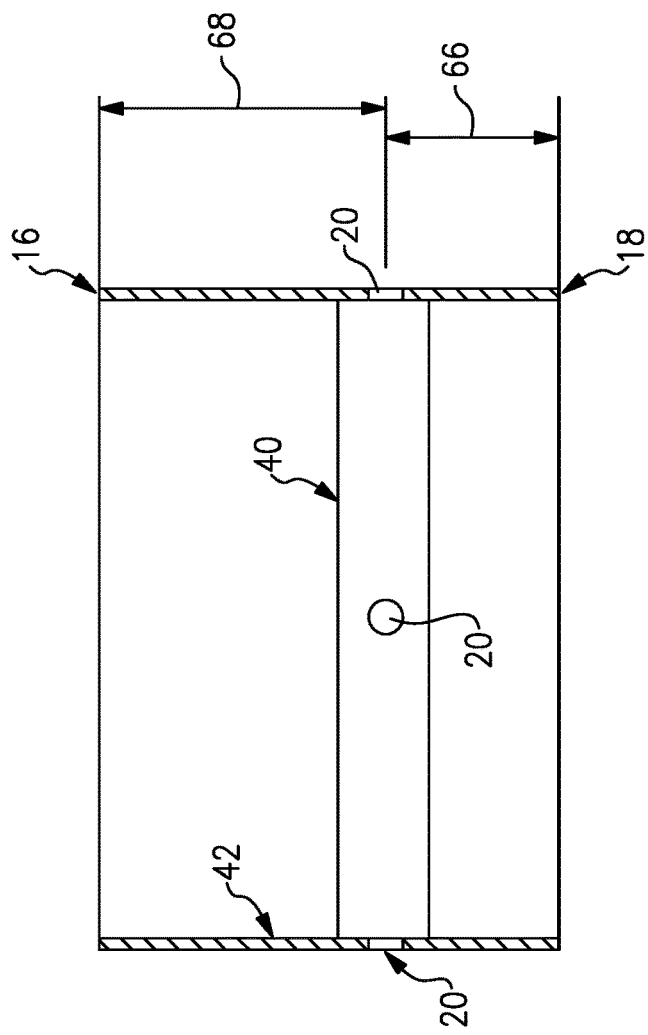
FIG. 9B is a top sectional view of the example guide tube.
Figure 9A:
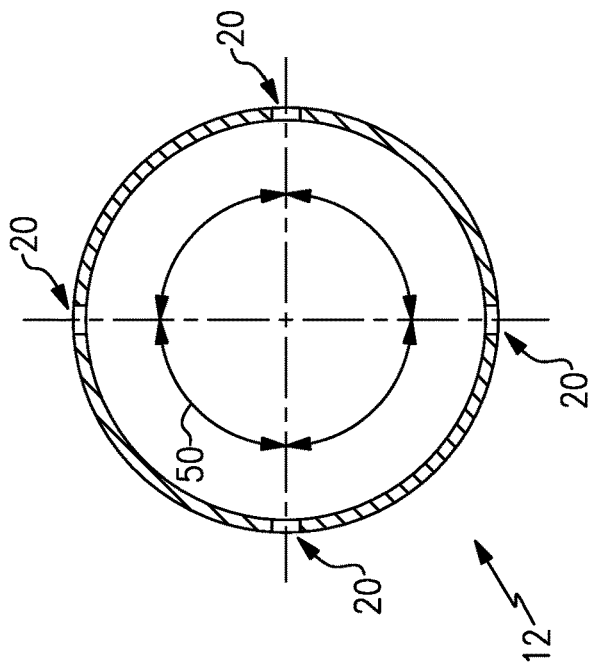
FIG. 9A is side sectional view of an example guide tube embodiment.

Referring to FIGS. 9A and 9B, the example guide tube 12 is shown without the bellow 14. The guide tube 12 includes four fixing openings 20 that are spaced every 90 degrees about the circumference of the guide tube 12. The openings 20 are spaced a distance 68 from the first end 16 and a distance 66 from the second end 18. The distance 68 is greater than the distance 66 in this disclosed embodiment. It should be appreciated, that the different distances 66, 68 are provided to provide a desired relative orientation between the bellow 14 and the guide tube 12. Other orientations could be utilized within the scope and contemplation of this disclosure.

Figure 10:
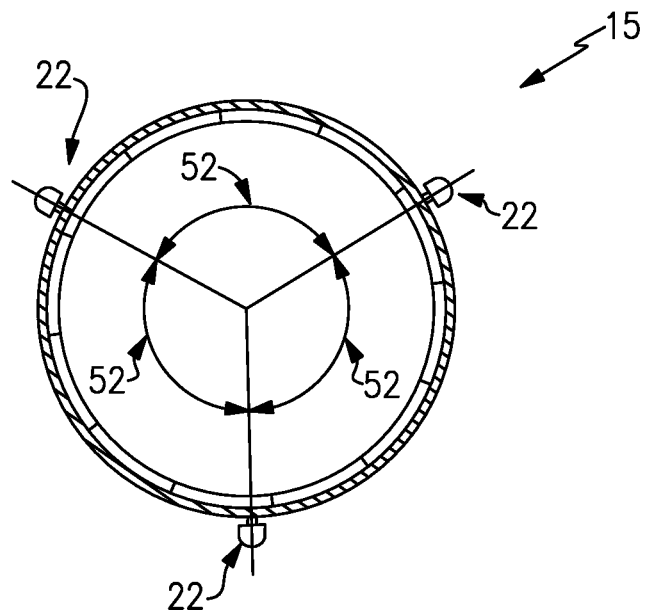
FIG. 10 is a top sectional view of another example bellow embodiment.
Figure 11:
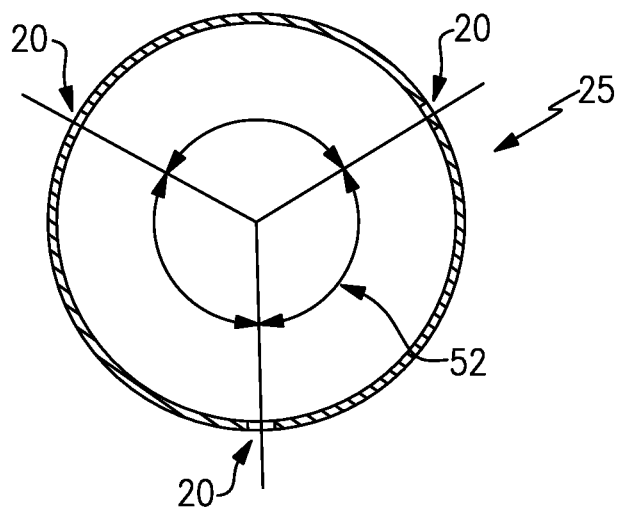
FIG. 11 is a top sectional view of another example guide tube embodiment.

Referring to FIGS. 10 and 11, another example bellow 15 and guide tube 25 are shown. The example bellow 15 includes three tabs 22 that are spaced evenly part by 120 degrees, indicated by arrows 52, about the circumference of the exterior surface 44. The example guide tube 25 includes three corresponding fixing openings 20 that are set apart 120 degrees as indicated at 52 to correspond with the number and location of the tabs 22.

Figure 12:
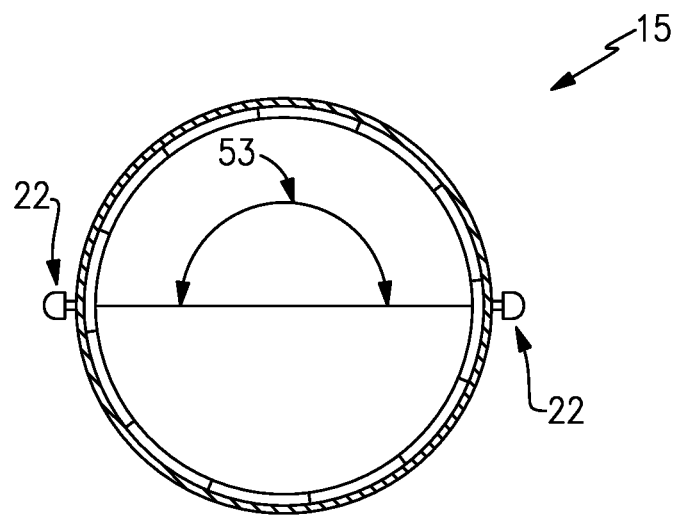
FIG. 12 is a top sectional view of yet another example bellow embodiment.
Figure 13:
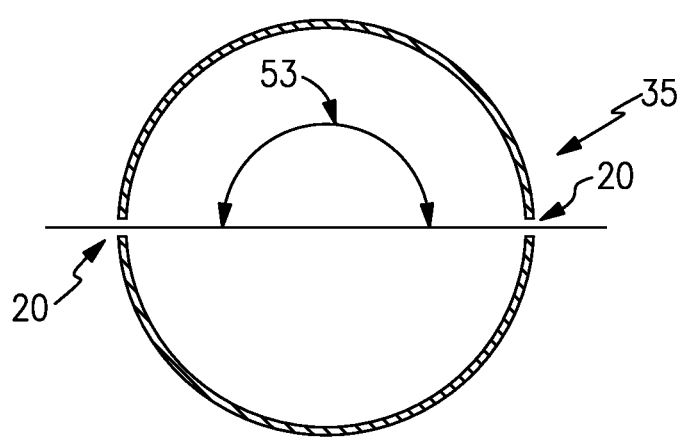
FIG. 13 is a top sectional view of yet another example guide tube embodiment.

Referring to FIGS. 12 and 13, in another disclosed example embodiment, the plurality of fixing openings 20 comprises two fixing openings on the guide tube 25 that are spaced 180 degrees apart as indicated by arrows 53. The plurality of tabs 22 formed in the bellow 15 comprises two tabs are also spaced 180 degrees apart as indicated by arrows 53. It should be understood that any number of tabs 22, openings 20 and spacings could be utilized and are within the scope and contemplation of this disclosure.

The disclosed air spring assembly includes openings 20 within the guide tube 12 and corresponding tabs 22 on the bellows 14 to ease assembly and hold a desired relative orientation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An air spring assembly comprising:
   a guide tube including a first end, a second end and a plurality of fixing openings spaced circumferentially from each other; and
   a bellow including a plurality of tabs extending from an outer surface of the bellow,
   wherein the bellow is disposed within the guide tube and the plurality of tabs are received within a corresponding one of the fixing openings.

2. The air spring assembly as recited in claim 1, wherein the tabs include a retention portion spaced apart from the outer surface of the bellow by a stem portion, wherein the retention portion is larger than the fixing openings.

3. The air spring assembly as recited in claim 2, wherein the retention portion includes a rounded surface to aid in insertion through a corresponding one of the plurality of fixing openings.

4. The air spring assembly as recited in claim 1, wherein the plurality of tabs are formed of the same material as the bellow.

5. The air spring assembly as recited in claim 1, wherein the plurality of tabs are integral portions of the bellow.

6. The air spring assembly as recited in claim 1, wherein the plurality of fixing openings are all spaced a common distance from one of the first end and the second end.

7. The air spring assembly as recited in claim 6, wherein the plurality of fixing openings are spaced apart from a midpoint between the first end and the second end.

8. The air spring assembly as recited in claim 1, wherein the guide tube includes at least one retention groove extending circumferentially about an interior surface and aligned with the plurality of fixing openings.

9. The air spring assembly as recited in claim 1, wherein the plurality of fixing openings comprises two fixing openings spaced 180 degrees apart and the plurality of tabs comprise two tabs spaced 180 degrees apart.

10. The air spring assembly as recited in claim 1, wherein the plurality of fixing openings comprises three fixing openings spaced 120 degrees apart and the plurality of tabs comprise three tabs spaced 120 degrees apart.

11. The air spring assembly as recited in claim 1, wherein the plurality of fixing openings comprises four fixing openings spaced 90 degrees apart and the plurality of tabs comprises four tabs spaced 90 degrees apart.

12. A method of assembling an air spring assembly comprising:
   forming a bellow to include a plurality of tabs that extend from an outer surface;
   forming a guide tube to include a plurality of fixing openings disposed within a common plane spaced circumferentially apart from each other;
   placing the bellow within the guide tube; and
   assembling the plurality of tabs through corresponding ones of the plurality of fixing openings to retain the bellow in a desired orientation relative to the guide tube.

13. The method as recited in claim 12, including forming the bellow and the plurality of tabs as a single integral part.

14. The method as recited in claim 13, including forming the tabs to include a retention portion spaced apart from the outer surface of the bellow by a stem portion, wherein the retention portion is larger than the fixing openings.

15. The method as recited in claim 14, including forming the retention portion to include a semi-spherical surface to aid in insertion through a corresponding one of the plurality of fixing openings.

16. The method as recited in claim 12, including forming the plurality of fixing openings to be spaced apart a common distance from a first end of the guide tube.

17. The method as recited in claim 16, including forming the plurality of fixing openings to be spaced apart from a middle point between the first end and a second end of the guide tube.

18. The method as recited in claim 12, including forming the guide tube to include at least one retention groove extending circumferentially about an interior surface and aligned with the plurality of fixing openings.

19. The method as recited in claim 12, wherein forming the plurality of fixing openings comprises forming three fixing openings spaced 120 degrees apart and forming the plurality of tabs comprises forming three tabs spaced 120 degrees apart.

20. The method as recited in claim 12, wherein forming the plurality of fixing openings comprises forming four fixing openings spaced 90 degrees apart and forming the plurality of tabs comprises forming four tabs spaced 90 degrees apart.

\* \* \* \* \*